(12) United States Patent
Maeda (10) Patent No.: US 9,600,234 B2
(45) Date of Patent: Mar. 21, 2017

(54) FLOATING-POINT ARITHMETIC DEVICE, SEMICONDUCTOR DEVICE AND INFORMATION PROCESSING SYSTEM

(71) Applicant: Kabushiki Kaisha Toshiba, Minato-ku, Tokyo (JP)

(72) Inventor: Seiji Maeda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 14/643,279

(22) Filed: Mar. 10, 2015

(65) Prior Publication Data

US 2016/0070536 A1  Mar. 10, 2016

(30) Foreign Application Priority Data

Sep. 9, 2014  (JP) ................. 2014-183508

(51) Int. Cl.
*G06F 7/38* (2006.01)
*G06F 7/483* (2006.01)
*G06F 7/499* (2006.01)

(52) U.S. Cl.
CPC .......... *G06F 7/483* (2013.01); *G06F 7/49947* (2013.01)

(58) Field of Classification Search
CPC ............................. G06F 7/483; G06F 7/49947
USPC ................................................ 708/497, 551
See application file for complete search history.

(56) References Cited

U.S. PATENT DOCUMENTS

| 5,268,854 A | 12/1993 | Ikumi |
| 6,005,590 A | 12/1999 | Negishi et al. |
| 7,028,066 B2 | 4/2006 | Arakawa et al. |
| 7,567,996 B2 | 7/2009 | Arakawa et al. |
| 8,341,204 B2 | 12/2012 | Arakawa et al. |
| 2003/0195912 A1 | 10/2003 | Wada |
| 2005/0289209 A1* | 12/2005 | Robison .................. G06F 7/535 708/650 |
| 2013/0166878 A1 | 6/2013 | Arakawa et al. |
| 2015/0081752 A1 | 3/2015 | Maeda et al. |

FOREIGN PATENT DOCUMENTS

| GB | 2262823 A | * 6/1993 | ............. G06F 7/483 |
| JP | 08-021087 | 3/1996 | |
| JP | 2015-056124 A | 3/2015 | |

* cited by examiner

*Primary Examiner* — Tan V. Mai
(74) *Attorney, Agent, or Firm* — Knobbe, Martens, Olson & Bear, LLP

(57) ABSTRACT

A floating-point arithmetic device of an embodiment includes: a first functional unit configured to receive first input data to execute first arithmetic operation in a first rounding mode; a second functional unit configured to receive second input data to execute second arithmetic operation in a second rounding mode; a first output circuit capable of selectively outputting a first output or a first arithmetic operation result of the first arithmetic operation, the first output obtained by halving a first value obtained by adding a second arithmetic operation result of the second arithmetic operation to the first arithmetic operation result; and a second output circuit capable of selectively outputting a second output or the second arithmetic operation result, the second output obtained by halving a second value obtained by subtracting the second arithmetic operation result from the first arithmetic operation result.

13 Claims, 6 Drawing Sheets

FLOATING-POINT ARITHMETIC DEVICE, SEMICONDUCTOR DEVICE AND INFORMATION PROCESSING SYSTEM

CROSS REFERENCE TO RELATED APPLICATION

This application is based upon and claims the benefit of priority from the prior Japanese Patent Application No. 2014-183508 filed in Japan on Sep. 9, 2014; the entire contents of which are incorporated herein by reference.

FIELD

Embodiments described herein relate generally to a floating-point arithmetic device, a semiconductor device and an information processing system.

BACKGROUND

Conventionally, floating-point arithmetic operation for approximately performing real number arithmetic operation in a computer has been used. In the floating-point arithmetic operation, a real number is approximated and expressed in a floating-point number, and an arithmetic operation result is approximated to a floating-point number in accordance with a rounding mode specified in advance. Five kinds of rounding modes are defined in IEEE754. For example, the following two kinds of rounding modes are defined. One is a rounding-up mode, and the other is a rounding-down mode.

In the rounding-up mode, a process for approximating an arithmetic operation result to a smallest floating-point number among floating-point numbers equal to or larger than the arithmetic operation result is performed. Hereinafter, the rounding-up process will be denoted by $\Delta$. In the rounding-down mode, a process for approximating an arithmetic operation result to a largest floating-point number among floating-point numbers equal to or smaller than the arithmetic operation result is performed. Hereinafter, the rounding-down process will be denoted by $\nabla$.

Though a floating-point functional unit capable of executing arithmetic operation in these rounding modes has been realized, there is a problem that arithmetic operation accuracy cannot be acquired after performing arithmetic operation.

On the contrary, arithmetic operation called machine interval arithmetic operation is proposed, by which arithmetic operation accuracy using floating-point arithmetic operation can be acquired. In the machine interval arithmetic operation, a machine interval expressed by a pair of a lower-limit value and an upper-limit value is used. The machine interval is defined as shown by the following equation (1).

$$\text{Machine interval } [x] = [\nabla \underline{x}, \Delta \overline{x}] \qquad \text{Equation (1)}$$

A central value x and an error radius r can be determined from the machine interval [x], as shown by the following equations (2) and (3).

$$x = \frac{\Delta \overline{x} + \nabla \underline{x}}{2} \qquad \text{Equation (2)}$$

$$r = \frac{\Delta \overline{x} - \nabla \underline{x}}{2} \qquad \text{Equation (3)}$$

For example, it is possible to adopt the central value x as an approximate value or a true value of an arithmetic operation result and use the error radius r for accuracy evaluation of the arithmetic operation result.

Four basic arithmetic operations are defined as shown by the following equations (4) to (7).

$$[x]+[y]=[\nabla(\underline{x}+\underline{y}), \Delta(\overline{x}+\overline{y})] \qquad \text{Equation (4)}$$

$$[x]-[y]=[\nabla(\underline{x}-\overline{y}), \Delta(\overline{x}-\underline{y})] \qquad \text{Equation (5)}$$

$$[x]\times[y]=[\min\{\nabla(\underline{x}\times\underline{y}),\nabla(\underline{x}\times\overline{y}),\nabla(\overline{x}\times\underline{y}),\nabla(\overline{x}\times\overline{y})\}, \max\{\Delta(\underline{x}\times\underline{y}),\Delta(\underline{x}\times\overline{y}),\Delta(\overline{x}\times\underline{y}),\Delta(\overline{x}\times\overline{y})\}] \qquad \text{Equation (6)}$$

$$[x]+[y]=[\min\{\nabla(\underline{x}+\underline{y}),\nabla(\underline{x}+\overline{y}),\nabla(\overline{x}+\underline{y}),\nabla(\overline{x}+\overline{y})\}, \max\{\Delta(\underline{x}+\underline{y}),\Delta(\underline{x}+\overline{y}),\Delta(\overline{x}+\underline{y}),\Delta(\overline{x}+\overline{y})\}] \qquad \text{Equation (7)}$$

A functional unit which realizes the four basic arithmetic operations is also proposed.

An inner product $\Sigma[x] \times [y]$ of vectors X and Y each element of which is constituted by a machine interval can be calculated as shown by the following equation (8).

$$\Sigma[x]\times[y]=[\nabla\Sigma\nabla(\underline{x}\times\underline{y}), \Delta\Sigma\Delta(\overline{x}\times\overline{y})] \qquad \text{Equation (8)}$$

On the other hand, an SIMD (single instruction multiple data) functional unit which performs same arithmetic operation for a plurality of pieces of data at the same time has been conventionally used to realize high-speed arithmetic operation of a great amount of data. By using a floating-point functional unit as each of functional units constituting the SIMD functional unit, an SIMD floating-point functional unit can be realized. There is, however, a problem that arithmetic operation accuracy cannot be obtained after performing arithmetic operation.

DETAILED DESCRIPTION

A floating-point arithmetic device of an embodiment includes: a first functional unit configured to receive first input data to execute first arithmetic operation in a first rounding mode; and a second functional unit configured to receive second input data to execute second arithmetic operation in a second rounding mode. The first functional unit includes a first output circuit capable of selectively outputting a first output or a first arithmetic operation result of the first arithmetic operation, the first output obtained by halving a first value obtained by adding a second arithmetic operation result of the second arithmetic operation to the first arithmetic operation result; and the second functional unit includes a second output circuit capable of selectively outputting a second output or the second arithmetic operation result, the second output obtained by halving a second value obtained by subtracting the second arithmetic operation result from the first arithmetic operation result.

Embodiments will be described below with reference to drawings.

First Embodiment (Configuration)

Figure 1:
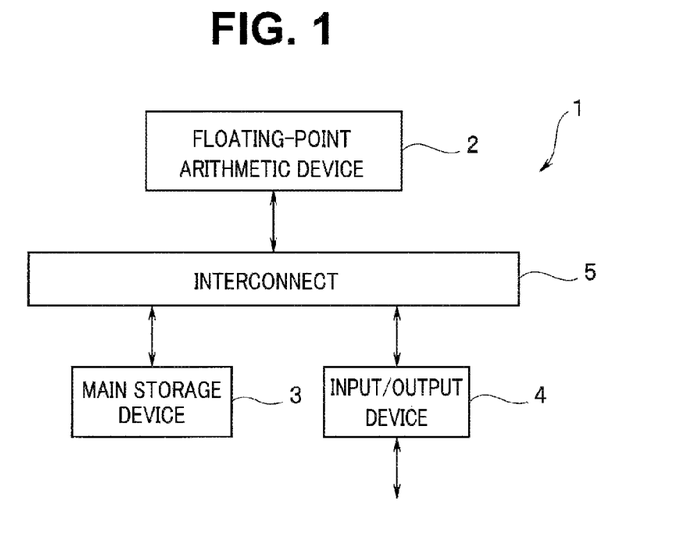
FIG. 1 is a block diagram of a data processing apparatus 1 relating to a first embodiment.

FIG. 1 is a block diagram of a data processing apparatus relating to the present embodiment. A data processing apparatus 1 is a processor constituted by one or more semiconductor devices, and the data processing apparatus 1 executes a predetermined arithmetic operation process for inputted data and outputs an arithmetic operation result.

The data processing apparatus 1 is configured with a floating-point arithmetic device 2, a main storage device 3, an input/output device 4 and a interconnect 5. The floating-point arithmetic device 2, the main storage device 3 and the input/output device 4 can exchange data with one another via the interconnect 5.

The floating-point arithmetic device 2 can switch between machine interval arithmetic operation (hereinafter referred to as interval arithmetic operation) and SIMD arithmetic operation and execute any of the arithmetic operations. Here, description will be made on a floating-point arithmetic device capable of executing interval arithmetic operation in which a result of arithmetic operation of an inner product of two vectors and arithmetic operation accuracy information can be simultaneously obtained.

The floating-point arithmetic device 2 is a circuit for performing floating-point arithmetic operation for inputted data.

The main storage device 3 temporarily stores input data and output data.

The input/output device 4 is an interface circuit for inputting data from an external apparatus not shown and outputting data to the external apparatus.

Data inputted via the input/output device 4 is stored into the main storage device 3. The floating-point arithmetic device 2 executes predetermined arithmetic operation for the inputted data and stores an arithmetic operation result into the main storage device 3. Arithmetic operation result data is outputted to the external apparatus via the input/output device 4.

Figure 2:
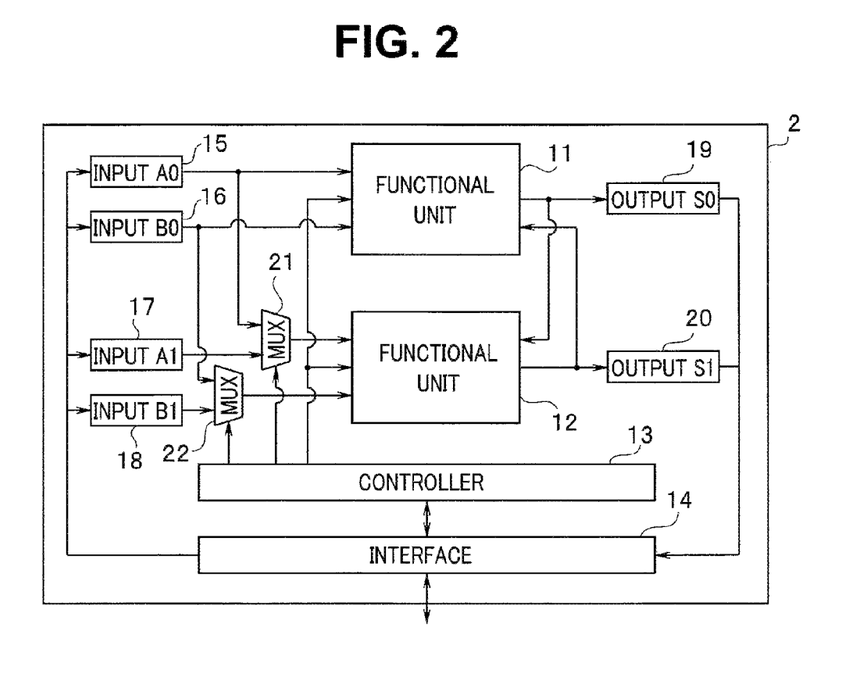
FIG. 2 is a block diagram showing a configuration of a floating-point arithmetic device 2 relating to the first embodiment.

FIG. 2 is a block diagram showing a configuration of the floating-point arithmetic device 2. The floating-point arithmetic device 2 includes two functional units 11 and 12, a controller 13, an interface 14, four input registers 15 to 18, two output registers 19 and 20 and two multiplexers (indicated by MUX in the figure) 21 and 22.

Input data is inputted to the interface 14 via the interconnect 5, and the interface 14 outputs the data to the input registers 15 to 18. First input data is inputted to the input registers 15 and 16. Second input data is inputted to the input registers 17 and 18. Output data from the output registers 19 and 20 is inputted to the interface 14, and the interface 14 outputs the data to the interconnect 5.

The controller 13 outputs control signals to the two functional units 11 and 12 and the two multiplexers 21 and 22 in response to a command inputted via the interface 14. The controller 13 controls each circuit in the floating-point arithmetic device 2 to execute predetermined arithmetic operation for input data from the input registers 15 to 18.

Data from the input registers 15 and 17 is inputted to the multiplexer 21, and the multiplexer 21 outputs data selected on a basis of a control signal to the functional unit 12.

Data from the input registers 16 and 18 is inputted to the multiplexer 22, and the multiplexer 22 outputs data selected on a basis of a control signal to the functional unit 12.

Data from the input registers 15 and 16, the functional unit 12 and the controller 13 is inputted to the functional unit 11, and the functional unit 11 outputs an arithmetic operation result to the output register 19 and the functional unit 12. Data from the multiplexers 21 and 22, the functional unit 11 and the controller 13 is inputted to the functional unit 12, and the functional unit 12 outputs an arithmetic operation result to the output register 20 and the functional unit 11.

Especially, in the floating-point arithmetic device 2 of the present embodiment, an arithmetic operation result of the functional unit 11 is inputted to the functional unit 12, and an arithmetic operation result of the functional unit 12 is inputted to the functional unit 11.

Hereinafter, pieces of input data stored in the input registers 15, 16, 17 and 18 are referred to as A0, B0, A1 and B1, respectively, and pieces of output data stored in the output registers 19 and 20 are referred to as S0 and S1, respectively.

The floating-point arithmetic device 2 has an interval arithmetic operation mode and an SIMD arithmetic operation mode. An arithmetic operation mode is specified from the outside via the input/output device 4 or specified in an executed arithmetic operation program.

In the interval arithmetic operation mode, an input A0 and an input B0 are inputted to the input registers 15 and 16, respectively. Input data are inputted to the functional units 11 and 12 via the multiplexers 21 and 22. That is, arithmetic operation of same input data is performed in the functional units 11 and 12. The functional unit 11 outputs an output S0, which is a central value, to the output register 19, and the functional unit 12 outputs an output S1, which is an error radius, to the output register 20.

Note that, in the interval arithmetic operation mode, the same input A0 as that of the input register 15 and the same input B0 as that of the input register 16 may be inputted to the input registers 17 and 18, respectively, without using the multiplexers 21 and 22.

In the SIMD arithmetic operation mode, the input A0 and the input B0 are inputted to the input registers 15 and 16, respectively, and an input A1 and an input B1 are inputted to the input registers 17 and 18, respectively. That is, the input A0 and the input B0 are inputted to the functional unit 11; the input A1 and the input B1 are inputted to the functional unit 12; and the functional units 11 and 12 execute predetermined arithmetic operation. The functional unit 11 outputs an output S0, which is a result of the arithmetic operation of the inputs A0 and B0, to the output register 19, and the functional unit 12 outputs an output S1, which is a result of the arithmetic operation of the inputs A1 and B1, to the output register 20.

Note that the two functional units 11 and 12 may execute a same arithmetic operation or may execute different arithmetic operations.

Figure 3:
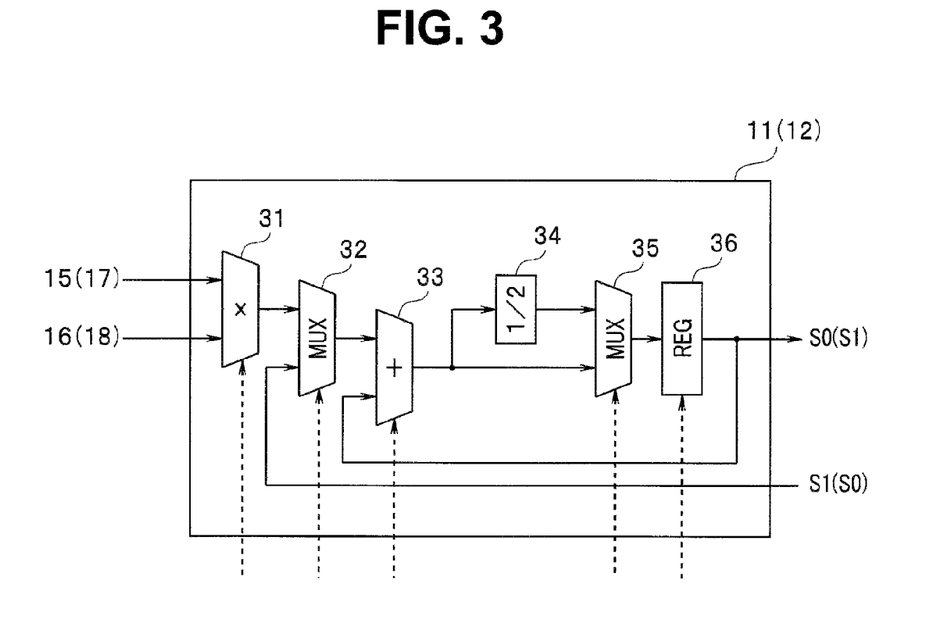
FIG. 3 is a circuit diagram of functional units 11 and 12 relating to the first embodiment.

FIG. 3 is a circuit diagram of the functional unit 11 (12). Each of the functional units 11 and 12 is configured with a multiplier (indicated by × in the FIG. 3) 31, a multiplexer (indicated by MUX in FIG. 3) 32, an adder-subtracter (indicated by + in FIG. 3) 33, a halver 34, a multiplexer (indicated by MUX in FIG. 3) 35 and a register 36.

Two pieces of input data are inputted to an input port of the multiplier 31, and a multiplication result is inputted to one input port of the multiplexer 32. Output data of another functional unit is inputted to the other input port of the multiplexer 32.

More specifically, an output S1, which is a register value of the register 36 of the functional unit 12, is inputted to the multiplexer 32 of the functional unit 11. An output S0, which is a register value of the register 36 of the functional unit 11, is also inputted to the multiplexer 32 of the functional unit 12.

An output of the multiplexer 32 and an output of the register 36 are inputted to an input port of the adder-subtracter 33. An output of the adder-subtracter 33 is inputted to an input port of the halver 34. An output of the adder-subtracter 33 and an output of the halver 34 are inputted to an input port of the multiplexer 35. An output of the multiplexer 35 is inputted to an input port of the register 36.

The multiplier 31 and the adder-subtracter 33 are provided with arithmetic operation functions corresponding to at least two kinds of rounding modes (rounding-up and rounding-down). Specification of a rounding mode is performed by control signals (indicated by dotted lines) to the multiplier 31 and the adder-subtracter 33.

Thus, the functional unit 11 constitutes a first functional unit configured to execute a first arithmetic operation process for first input data in a set first rounding mode, and the functional unit 12 constitutes a second functional unit configured to execute a second arithmetic operation process for second input data in a set second rounding mode.

In the interval arithmetic operation mode, the functional unit 11 performs a process in the rounding-up mode, and the functional unit 12 performs a process in the rounding-down mode.

In the SIMD arithmetic operation mode, both the functional unit 11 and the functional unit 12 perform a same process in either the rounding-up mode or the rounding-down mode.

Selection of inputs to the multiplexers 32 and 35 is performed by control signals (indicted by dotted lines). Initialization of the register 36 is also performed by a control signal (indicated by a dotted line).

Thus, the adder-subtracter 33 and the halver 34 of the functional unit 11 constitute a first output circuit capable of selectively outputting a first output obtained by halving a value obtained by adding an arithmetic operation result of the functional unit 12 to an arithmetic operation result of the adder-subtracter 33, or the arithmetic operation result of the adder-subtracter 33 of the functional unit 11. The adder-subtracter 33 and the halver 34 of the functional unit 12 constitute a second output circuit capable of selectively outputting a second output obtained by halving a value obtained by subtracting the arithmetic operation result of the adder-subtracter 33 of the functional unit 12 from the arithmetic operation result of the adder-subtracter 33 of the functional unit 11, or the arithmetic operation result of the adder-subtracter 33 of the functional unit 12.

The functional unit 11 has the adder-subtracter 33 configured such that an arithmetic operation result of the multiplier 31, which is a functional unit, is inputted to perform cumulative addition, the register 36 configured to store an addition value obtained by cumulative addition by the adder-subtracter 33, and the multiplexer 32 as a selection circuit for selectively switching between the arithmetic operation result of the multiplier 31 and a register value of the register 36 of the functional unit 12 and inputting the arithmetic operation result or the register value to the adder-subtracter 33.

The functional unit 12 has the adder-subtracter 33 configured such that an arithmetic operation result of the multiplier 31, which is a functional unit, is inputted to perform cumulative addition, the register 36 configured to store an addition value obtained by cumulative addition by the adder-subtracter 33, and the multiplexer 32 as a selection circuit for selectively switching between the arithmetic operation result of the multiplier 31 and a register value of the register 36 of the functional unit 11 and inputting the arithmetic operation result or the register value to the adder-subtracter 33.

Furthermore, the first output circuit of the functional unit 11 has the multiplexer 35 which is a selection circuit configured to selectively switch between an output of the halver 34, which is a halving circuit, and an arithmetic operation result of the adder-subtracter 33 and output the output or the arithmetic operation result to the register 36.

The second output circuit of the functional unit 12 has the multiplexer 35 which is a selection circuit configured to selectively switch between an output of the halver 34, which is a halving circuit, and an arithmetic operation result of the adder-subtracter 33 and output the output or the arithmetic operation result to the register 36.

(Operation)

The data processing apparatus 1 is capable of executing both of interval arithmetic operation and SIMD arithmetic operation. When the interval arithmetic operation mode is set, interval arithmetic operation is executed. When the SIMD arithmetic operation mode is set, SIMD arithmetic operation is executed.

Next, operations at a time of the interval arithmetic operation mode and at a time of the SIMD arithmetic operation mode will be described.

a. Arithmetic Operation of Inner Product Based on Interval Arithmetic Operation

First, an operation of the floating-point arithmetic device 2 at the time of the interval arithmetic operation mode will be described. Here, the interval arithmetic operation will be described, with inner product arithmetic operation of two vectors X and Y as an example.

a1) When the data processing apparatus 1 is set to the interval arithmetic operation mode, the multiplier 31 and the adder-subtracter 33 of one functional unit are set to the rounding-up mode, and the multiplier 31 and the adder-subtracter 33 of the other functional unit are set to the rounding-down mode, in the floating-point arithmetic device 2. Here, it is assumed that the multiplier 31 and the adder-subtracter 33 of the functional unit 11 are set to the rounding-up mode, and the multiplier 31 and the adder-subtracter 33 of the functional unit 12 are set to the rounding-down mode.

a2) The controller 13 controls the multiplexer 32 so that an output of the multiplier 31 is selected as an input to the adder-subtracter 33, in the functional units 11 and 12.

a3) The controller 13 controls the multiplexer 35 so that an output of the adder-subtracter 33 is selected as an input to the register 36 in each of the functional units 11 and 12.

a4) The controller 13 initializes the registers 36 of the functional units 11 and 12.

a5) Next, the following process is executed for each element of the two vectors X and Y.

a5-1) First, elements of the vector X are inputted to the input register 15 as an input A0. Elements of the vector Y are inputted to the input register 16 as an input B0.

a5-2) Multiplication of the inputs A0 and B0 is executed in the multiplier 31 of each of the functional units 11 and 12.

a5-3) Addition of a result of the multiplication by the multiplier 31 and a register value of the register 36 is executed in the adder-subtracter 33 of each of the functional units 11 and 12.

a5-4) A result of the addition by the adder-subtracter 33 is stored into the register 36.

The above process from a5-1 to a5-4 is executed for all the elements of the two vectors X and Y. The functional unit 11 outputs an inner product value of the vectors X and Y for which the rounding-up process has been performed, and the functional unit 12 outputs the inner product value of the vectors X and Y for which the rounding-down process has been performed.

That is, the value of the inner product of the vectors X and Y shown by the equation (8) described above is outputted. The register value of the register 36 of the functional unit 11 is an upper-limit value of interval arithmetic operation for the inner product of the two vectors X and Y. The register value of the register 36 of the functional unit 12 is a lower-limit value of the interval arithmetic operation for the inner product of the two vectors X and Y.

a6) After the process is executed for all the elements of the two vectors X and Y, the controller 13 controls the multiplexer 32 so that, in each of the functional units 11 and 12, an arithmetic operation result of the other functional unit is selected as an input to the adder-subtracter 33. The input to the adder-subtracter 33 is an output of the functional unit 12 in a case of the functional unit 11 and is an output of the functional unit 11 in a case of the functional unit 12.

a7) Furthermore, the controller 13 controls the multiplexer 35 so that an output of the halver 34 is selected as an input to the register 36, in each of the functional units 11 and 12.

a8) The adder-subtracter 33 of the functional unit 11 adds the register value of the register 36 and an output value of the functional unit 12 to each other.

a9) The adder-subtracter 33 of the functional unit 12 subtracts the register value of the register 36 from an output value of the functional unit 11.

a10) The adder-subtracter 33 of the functional unit 11 outputs a sum of the upper-limit and lower-limit values of the interval arithmetic operation to the halver 34. A central value of the interval arithmetic operation, which is an output of the halver 34, is stored into the register 36 of the functional unit 11.

a11) The adder-subtracter 33 of the functional unit 12 outputs a difference between the upper-limit and lower-limit values of the interval arithmetic operation to the halver 34. A radius of the interval arithmetic operation, which is one of pieces of arithmetic operation accuracy information about the interval arithmetic operation and which is an output of the halver 34, is stored into the register 36 of the functional unit 12.

As described above, the floating-point arithmetic device 2 outputs an arithmetic operation result of and arithmetic operation accuracy information about interval arithmetic operation using two functional units in the interval arithmetic operation mode.

b. Arithmetic Operation of Inner Product Based on SIMD Arithmetic Operation

Next, operations of the floating-point arithmetic device 2 at the time of the SIMD arithmetic operation mode will be described. Here, description will be made on SIMD arithmetic operation in which two inner product arithmetic operations of the vectors X and Y are executed.

b1) When the data processing apparatus 1 is set to the SIMD arithmetic operation mode, the controller 13 sets the multipliers 31 and the adder-subtracters 33 of the functional units 11 and 12 to a same rounding mode. That is, the controller 13 sets both the functional units 11 and 12 to a same rounding-up or rounding-down mode. Here, it is assumed that the rounding mode is set to the rounding-up mode.

b2) The controller 13 controls the multiplexer 32 so that an output of the multiplier 31 is selected as an input to the adder-subtracter 33, in the functional units 11 and 12.

b3) The controller 13 controls the multiplexer 35 so that an output of the adder-subtracter 33 is selected as an input to the register 36 in each of the functional units 11 and 12.

b4) Then, the controller 13 initializes the registers 36 of both the functional units 11 and 12.

b5) Next, the following process is executed for each element of vectors X0 and Y0 and each element of vectors X1 and Y1.

b5-1) First, the controller 13 controls the interface 14 to input the elements of the vector X0, the elements of the vector Y0, the elements of the vector X1 and the elements of the vector Y1 to the registers 15, 16, 17 and 18, respectively.

b5-2) Multiplication of the inputs A0 and B0 is executed in the multiplier 31 of the functional unit 11, and multiplication of the inputs A1 and B1 is executed in the multiplier 31 of the functional unit 12.

b5-3) Addition of a result of the multiplication by the multiplier 31 and a register value of the register 36 is executed in the adder-subtracter 33 of each of the functional units 11 and 12.

b5-4) Results of the addition by the adder-subtracters 33 of the functional units 11 and 12 are stored into the respective registers 36.

By the above process from b-1 to b-5 being executed for each element of the vectors X0 and Y0 and each element of the vectors X1 and Y1, SIMD arithmetic operation is executed in each of the functional units 11 and 12.

In the above SIMD arithmetic operation, two inner products are determined with use of the functional units 11 and 12. However, one inner product may be determined with use of the two functional units 11 and 12 at a double speed.

An operation of the floating-point arithmetic device 2 at the time of the SIMD arithmetic operation mode in that case will be described.

c1) A process after the controller 13 sets the rounding modes of the multipliers 31 and the adder-subtracters 33 of both the two functional units 11 and 12 to a same rounding mode when the data processing apparatus 1 is set to the SIMD arithmetic operation mode until initializing the registers 36 of both the functional units 11 and 12 is similar to the operations b1 to b4 of the SIMD arithmetic operation described above.

c2) The following process is performed for each element of the vectors X and Y. The process is different from the operation of the SIMD arithmetic operation described above.

c2-1) The controller 13 controls the interface 14 to cause elements of each of the vectors X and Y to be alternately inputted to input registers in order. The interface 14 repeats a process of inputting an element of the vector X to an input A0, inputting an element of the vector Y to an input B0, inputting a next element of the vector X to an input A1 and inputting a next element of the vector Y to an input B1.

For example, the controller 13 inputs an odd-numbered element of the vector X to the input register 15, inputs an odd-numbered element of the vector Y to the input register 16, inputs an even-numbered element of the vector X to the input register 17 and inputs an even-numbered element of the vector Y to the input register 18.

That is, a half of a pair of vector data of the vectors X and Y is inputted to the functional unit 11, and the remaining half of the pair of vector data of the vectors X and Y is inputted to the functional unit 12.

c2-2) Arithmetic operation of the inputs A0 and B0 is executed in the functional unit 11, and arithmetic operation of the inputs A1 and B1 is executed in the functional unit 12.

The above process is executed for all odd-numbered processing target elements of the vectors X and Y, in the functional unit 11, and is executed for all even-numbered processing target elements of the vectors X and Y, in the functional unit 12.

Then, when the process has been executed for all the elements of the vectors X and Y, the multiplexer 32 is controlled by the controller 13 so that an input to the adder-subtracter 33 becomes an output to the other functional unit.

c3) In the adder-subtracter 33 of the functional unit 11, the register value of the register 36 of the functional unit 11 and the register value of the register 36 of the functional unit 12 are added to each other, and a value of the addition is stored into the register 36 of the functional unit 11.

As described above, by SIMD arithmetic operation for the vectors X and Y is executed by the two functional units 11 and 12, the SIMD arithmetic operation is executed at a double speed.

According to the present embodiment, a floating-point arithmetic device can be realized which is capable of switching between the SIMD arithmetic operation mode and the interval arithmetic operation mode and executing the two arithmetic operation modes, using two functional units. That is, the floating-point arithmetic device of the present embodiment can execute SIMD arithmetic operation at a time of an arithmetic operation mode from which arithmetic operation accuracy is not required. On the other hand, at a time of an arithmetic operation mode from which arithmetic operation accuracy is required, the floating-point arithmetic device can execute interval arithmetic operation by which an arithmetic operation result of an inner product of two vectors and arithmetic operation accuracy can be acquired.

Second Embodiment

The floating-point arithmetic device of the first embodiment is capable of executing inner product arithmetic operation based on interval arithmetic operation or SIMD arithmetic operation. A floating-point arithmetic device of a second embodiment is capable of executing matrix product arithmetic operation based on interval arithmetic operation or SIMD arithmetic operation.

(Configuration)

Figure 4:
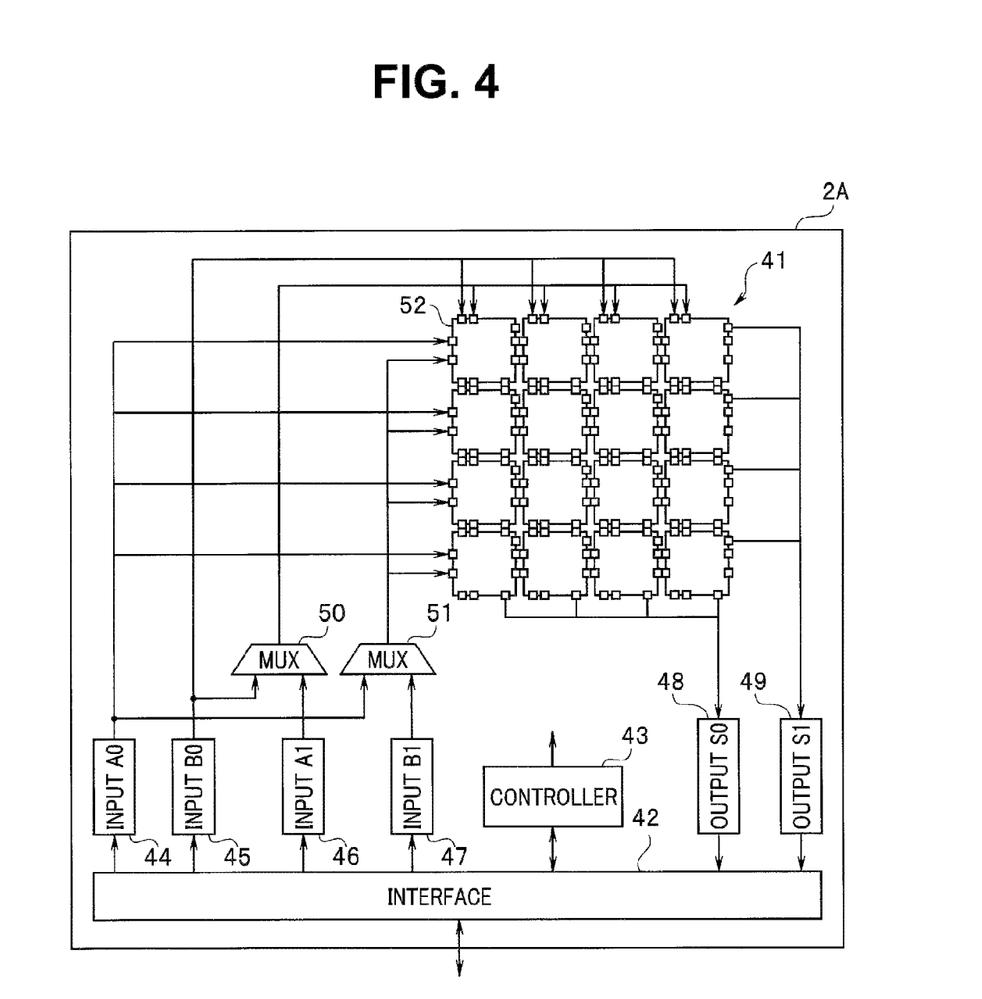
FIG. 4 is a block diagram of a floating-point arithmetic device 2A in a data processing apparatus relating to a second embodiment.

FIG. 4 is a block diagram of the floating-point arithmetic device of the second embodiment. A floating-point arithmetic device 2A is configured with an arithmetic operation array 41, an interface 42, a controller 43, four input registers 44 to 47, two output registers 48 and 49 and two multiplexers 50 and 51. A data processing apparatus having the floating-point arithmetic device 2A of the present embodiment is in a configuration similar to that of FIG. 1.

Note that description will be made here on an example of executing arithmetic operation of a matrix product of a 4×4 matrix.

The arithmetic operation array 41 is configured with a plurality of arithmetic operation nodes 52 connected in an array shape. The arithmetic operation array 41 shown in FIG. 4 is configured such that, in a part where arithmetic operation nodes 52 are horizontally connected, an output of a left-side arithmetic operation node 52 is connected to an input of a right-side arithmetic operation node 52, and, in a part where arithmetic operation nodes 52 are vertically connected, an output of an upper-side arithmetic operation node 52 is connected to an input of a lower-side arithmetic operation node 52, respectively.

The interface 42 outputs data inputted via the interconnect 5 to the registers 44 to 47. The interface 42 also outputs output data from the output registers 48 and 49 to the interconnect 5.

The controller 43 outputs a control signal to the arithmetic operation array 41 and the multiplexers 50 and 51 in response to a command inputted via the interface 42. The controller 43 also outputs a control signal to each of functional units 61 and 62 (FIG. 5) of each arithmetic operation node 52 of the arithmetic operation array 41.

Input data from the input registers 45 and 46 are inputted to the multiplexer 50, and the multiplexer 50 outputs data selected on a basis of a control signal to the arithmetic operation array 41.

Input data from the input registers 44 and 47 are inputted to the multiplexer 51, and the multiplexer 51 outputs data selected on a basis of a control signal to the arithmetic operation array 41.

Figure 5:
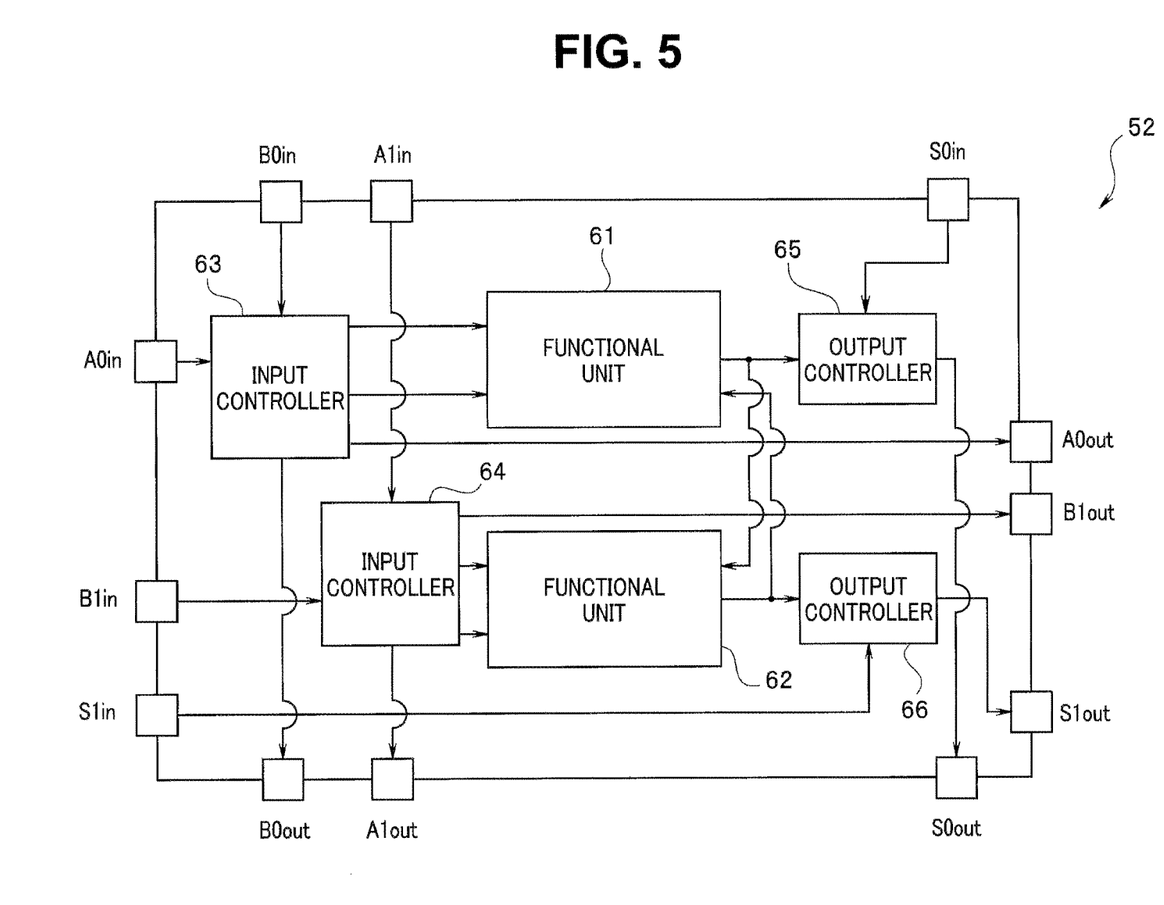
FIG. 5 is a block diagram showing a configuration of each arithmetic operation node 52 of an arithmetic operation array 41 relating to the second embodiment.

FIG. 5 is a block diagram showing a configuration of each arithmetic operation node 52 of the arithmetic operation array 41. The arithmetic operation node 52 is configured with the two functional units 61 and 62, two input controllers 63 and 64, and two output controllers 65 and 66. Furthermore, the arithmetic operation node 52 has six input terminals A0in, A1in, B0in, B1in, S0in and S1in and six output terminals A0out, A1out, B0out, B1out, S0out and S1out.

The functional units 61 and 62 have a same configuration as that of FIG. 3.

Two outputs of the input controller 63 and an output of the functional unit 62 are inputted to the functional unit 61. Two outputs of the input controller 64 and an output of the functional unit 61 are inputted to the functional unit 62.

The output of the functional unit 61 is inputted to the output controller 65 and the functional unit 62. The output of the functional unit 62 is inputted to the output controller 66 and the functional unit 61.

Figure 6:
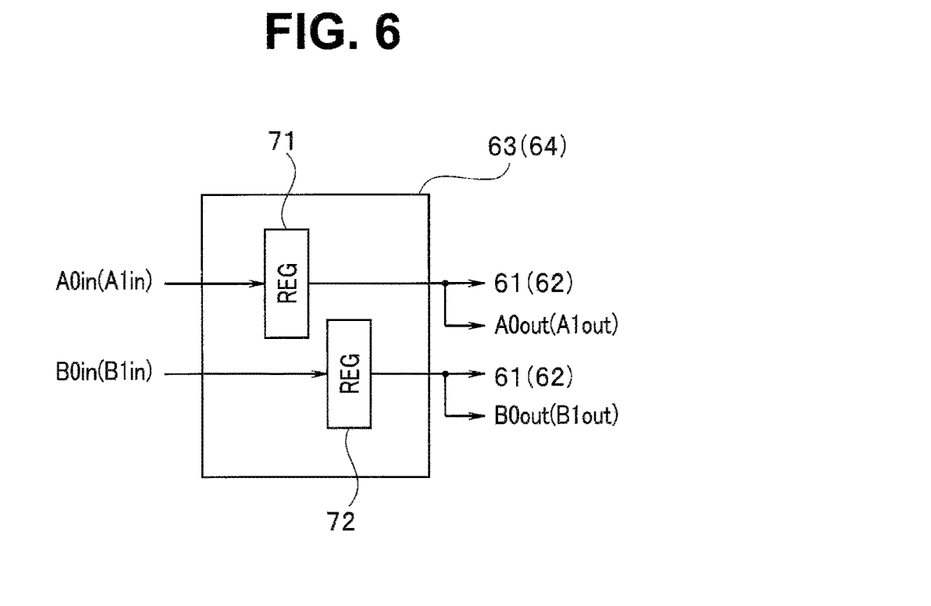
FIG. 6 is a circuit diagram of an input controller 63 (64) relating to the second embodiment.

FIG. 6 is a circuit diagram of the input controller 63 (64).

The input controller 63 (64) has two registers 71 and 72. The input terminal A0in (A1in) is connected to an input of the register 71, and the input terminal B0in (B1in) is connected to an input of the register 72. An output of the register 71 is connected to an input of the functional unit 61 (62) and the output terminal A0out (A1out). An output of the register 72 is connected to an input of the functional unit 61 (62) and the output terminal B0out (B1out).

In the arithmetic operation array 41, the output terminals A0out and B1out of each of arithmetic operation nodes 52 other than arithmetic operation nodes 52 at a right end are connected to the input terminals A0in and B1in of an arithmetic operation node 52 adjoining the arithmetic operation node 52 on a right side. That is, the output of the register 71 of the input controller 63 of each of the arithmetic operation nodes 52 other than the arithmetic operation nodes 52 at the right end is inputted to the register 71 of the input controller 63 of an arithmetic operation node 52 adjoining the arithmetic operation node 52 on the right side, and the output of the register 72 of the input controller 64 of each of the arithmetic operation nodes 52 other than the arithmetic operation nodes 52 at the right end is inputted to the register 72 of the input controller 64 of an arithmetic operation node 52 adjoining the arithmetic operation node 52 on the right side.

In the arithmetic operation array 41, the output terminals A1out and B0out of each of arithmetic operation nodes 52 other than arithmetic operation nodes 52 at a lower end are connected to the input terminals A1in and B0in of an arithmetic operation node 52 adjoining the arithmetic operation node 52 on a lower side. That is, the output of the register 71 of the input controller 64 of each of the arithmetic operation nodes 52 other than the arithmetic operation nodes 52 at the lower end is inputted to the register 71 of the input controller 64 of an arithmetic operation node 52 adjoining the arithmetic operation node 52 on the lower side, and the output of the register 72 of the input controller 63 of each of the arithmetic operation nodes 52 other than the arithmetic operation nodes 52 at the lower end is inputted to the register 72 of the input controller 63 of an arithmetic operation node 52 adjoining the arithmetic operation node 52 on the lower side.

That is, each of the input controllers 63 and 64 stores an input A and an input B, which are input data, into the registers 71 and 72, respectively, and outputs the input A and the input B.

Figure 7:
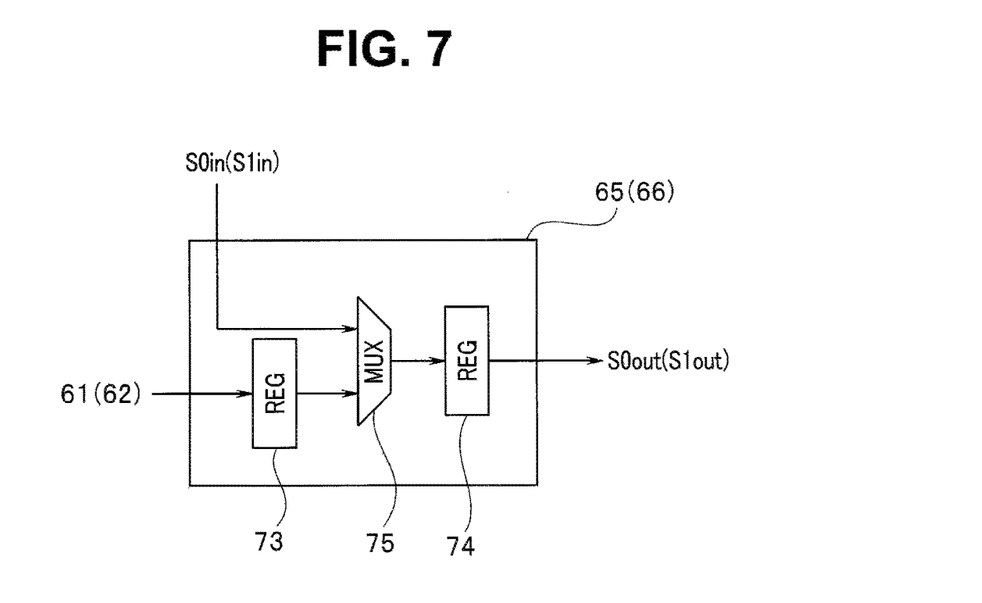
FIG. 7 is a circuit diagram of an output controller 65 (66) relating to the second embodiment.

FIG. 7 is a circuit diagram of the output controller 65 (66).

The output controller 65 (66) has two registers 73 and 74, and a multiplexer 75. An output of the functional unit 61 (62) is connected to an input of the register 73. An output of the register 73 and the input terminal S0in (S1in) are connected to an input of the multiplexer 75. An output of the multiplexer 75 is connected to an input of the register 74.

Each output controller 65 (66) stores an output of each functional unit 61 (62) into the register 73. If there is an input from the input terminal S0in (S1in), the multiplexer 75 selects the input. If there is not an input from the input terminal S0in (S1in), the multiplexer 75 selects an output of the register 73. A selected value is stored into the register 74 and outputted.

(Operation)

A data processing apparatus 1 of the present embodiment is also capable of executing both of interval arithmetic operation and SIMD arithmetic operation.

Next, an operation at the time of the interval arithmetic operation mode and at the time of the SIMD arithmetic operation mode will be described.

First, description will be made on an operation at the time of the interval arithmetic operation mode for determining a matrix product of two matrices AA0 and BB0.

At this time, in the floating-point arithmetic device 2A, row vector data of a matrix AA0 inputted to the input register 44 as an input A0 and column vector data of a matrix BB0 inputted to the input register 45 as an input B0 are inputted to the input terminals A0in and B0in of the arithmetic operation nodes 52, respectively. At a same time, same pieces of input data as the inputs A0 and B0 are inputted to the input terminals A1in and B1in via the multiplexers 50 and 51, respectively.

As a result, the arithmetic operation array 41 executes interval arithmetic operation of a matrix product in each arithmetic operation node 52, outputs an upper-limit value of a machine interval of the matrix product, which is an arithmetic operation result, to the output register 48 as an output S0, outputs a lower-limit value of the machine interval to the output register 49 as an output S1, and, after outputting the machine interval of the matrix product, outputs a matrix of central values and a matrix of error radius to the output register 48 and the output register 49, respectively.

Note that same input data may be inputted to the inputs A0 and B1 and to the inputs B0 and A1 without using a multiplexer.

Different arithmetic operations may be performed for matrix arithmetic operation of the inputs A0 and B0 and matrix arithmetic operation of the inputs A1 and B1.

d. Arithmetic Operation of Matrix Product Based on Interval Arithmetic Operation Next, an operation of arithmetic operation of a matrix product based on interval arithmetic operation will be described in detail.

d1) In the floating-point arithmetic device 2A, the multiplier 31 and the adder-subtracter 33 of one of the two functional units 61 and 62 of each arithmetic operation node 52 are set to the rounding-up mode, and the multiplier 31 and the adder-subtracter 33 of the other of the two functional units 61 and 62 of each arithmetic operation node 52 are set to the rounding-down mode.

d2) The controller 43 controls the multiplexer 32 so that an output of the multiplier 31 is selected as an input to the adder-subtracter 33 of each of the two functional units 61 and 62 of each arithmetic operation node 52.

d3) Furthermore, the controller 43 controls the multiplexer 35 so that an output of the adder-subtracter 33 is selected as an input to the register 36 of each arithmetic operation node 52.

d4) The controller 43 initializes the register 36 of each arithmetic operation node 52.

d5) The controller 43 divides the matrix AA0 into row vectors and inputs the row vectors to the input register 44 as an input A0. Similarly, the controller 43 divides the matrix BB0 into column vectors and inputs the column vectors to the input register 44 as an input B0.

d6) A row vector A0-0 of a first row of the matrix AA0 is inputted to the inputs A0in and B1in of a first row of the arithmetic operation array 41; a row vector A0-1 of a second row of the matrix AA0 is inputted to the inputs A0in and B1in of a second row of the arithmetic operation array 41; a row vector A0-2 of a third row of the matrix AA0 is inputted to the inputs A0in and B1in of a third row of the arithmetic operation array 41; and a row vector A0-3 of a fourth row of the matrix AA0 is inputted to the inputs A0in and B1in of a fourth row of the arithmetic operation array 41.

d7) A column vector B0-0 of a first column of the matrix BB0 is inputted to the inputs B0in and A1in of a first column of the arithmetic operation array 41; a column vector B0-1 of a second column of the matrix BB0 is inputted to the inputs B0in and A1in of a second column of the arithmetic operation array 41; a column vector B0-2 of a third column of the matrix BB0 is inputted to the inputs B0in and A1in of a third column of the arithmetic operation array 41; and a column vector B0-3 of a fourth column of the matrix BB0 is inputted to the inputs B0in and A1in of a fourth column of the arithmetic operation array 41.

d8) In each arithmetic operation node 52, the following process is executed for each inputted vector element.

d8-1) The input controller 63 stores and outputs the inputs A0in and B0in in order.

d8-2) The input controller 64 stores and outputs the inputs A1in and B1in in order.

d8-3) In the multiplier 31 of each of the functional units 61 and 62, two inputs are multiplied.

d8-4) In the adder-subtracter 33 of each of the functional units 61 and 62, a result of the multiplication by the multiplier 31 and a register value of the register 36 are added.

d8-5) An addition result is stored into the register 36 of each of the functional units 61 and 62; an upper-limit value of machine intervals of elements of a matrix product of an arithmetic operation result of the interval arithmetic operation is outputted from the output controller 65; and a lower-limit value of the machine intervals of the elements of the matrix product of the arithmetic operation result of the interval arithmetic operation is outputted from the output controller 66.

d9) After output of the machine intervals of all the elements of the matrix product is completed, the following process is performed in each arithmetic operation node 52.

d9-1) The controller 43 controls the multiplexer 32 so that an input from an outside is selected as an input to the adder-subtracters 33 of both the functional units 61 and 62 of each arithmetic operation node 52.

d9-2) Furthermore, the controller 43 controls the multiplexer 35 so that an output of the halver 34 is selected as an input to the register 36 in each of both the functional units 61 and 62 of each arithmetic operation node 52.

d9-3) Then, addition of the two inputs is performed in the adder-subtracter 33 of each functional unit 61, and subtraction between the two inputs is performed in the adder-subtracter 33 of each functional unit 62.

d9-4) In each of both the functional units 61 and 62 of each arithmetic operation node 52, halving arithmetic operation of an output of the adder-subtracter 33 is executed by the halver 34, and an arithmetic operation result of the halver 34 is stored into the register 36.

d9-5) The output controller 65 stores and outputs outputs of the register 36 of the functional unit 61 in order.

d9-6) The output controller 66 stores and outputs outputs of the register 36 of the functional unit 62 in order.

In the arithmetic operation array 41, an output S0 of the first column, an output S0 of the second column, an output S0 of the third column and an output S0 of the fourth column are outputted to the output register 48 as a column vector S0-0 of a first column of a result matrix S0, a column vector S0-1 of a second column of the result matrix S0, a column vector S0-2 of a third column of the result matrix S0 and a column vector S0-3 of a fourth column of the result matrix S0, respectively.

In the arithmetic operation array 41, an output S1 of the first row, an output S1 of the second row, an output S1 of the third row and an output S1 of the fourth row are outputted to the output register 49 as a row vector S1-0 of a first row of a result matrix S1, a row vector S1-1 of a second row of the result matrix S1, a row vector S1-2 of a third row of the result matrix S1 and a row vector S1-3 of a fourth row of the result matrix S1, respectively.

When the machine intervals of the matrix product are outputted, the four column vectors S0-0 to S0-3 of the output register 48 are integrated and outputted as an upper-limit value of machine intervals of a matrix SS0, which is a result of arithmetic operation of the matrix product, and the four row vectors S1-0 to S1-3 of the output register 49 are integrated and outputted as a lower-limit value of the machine intervals of the matrix SS0, which is a result of arithmetic operation of the matrix product.

When a central value and an error radius of the matrix product are outputted, the four column vectors S0-0 to S0-3 of the output register 48 are integrated and outputted as a central value matrix SS0, and the four row vectors S1-0 to S1-3 of the output register 49 are integrated and outputted as an error radius matrix SS1.

Next, an operation at the time of the SIMD arithmetic operation mode will be described.

At this time, in the floating-point arithmetic device 2A, an input A0 and an input B0 are inputted to the input register 44 and the input register 45, respectively, to calculate one matrix product, and an input A1 and an input B1 are inputted to the input register 46 and the input register 47, respectively, to calculate another matrix product. In that case, in the arithmetic operation array 41, the arithmetic operation of the inputs A0 and B0 and the arithmetic operation of the inputs A1 and B1 are separately executed, and a result of the arithmetic operation of the inputs A0 and B0 and a result of the arithmetic operation of the inputs A1 and B1 are outputted to an output S0 and an output S1, respectively.

e. Arithmetic Operation of Matrix Product Based on SIMD Arithmetic Operation

Next, an operation of arithmetic operation of a matrix product based on SIMD arithmetic operation will be described in detail.

e1) First, the controller 43 sets the multipliers 31 and the adder-subtracters 33 of the functional units 61 and 62 of each arithmetic operation node to a same rounding mode. For example, when the multiplier 31 and the adder-subtracter 33 of the functional unit 61 are set to the rounding-up mode, the multiplier 31 and the adder-subtracter 33 of the functional unit 62 are also set to the rounding-up mode.

e2) The controller 43 controls the multiplexer 32 so that an output of the multiplier 31 is selected as an input to the adder-subtracter 33 of each of the functional units 61 and 62.

e3) The controller 43 controls the multiplexer 35 so that an output of the adder-subtracter 33 is selected as an input to the register 36 of each of the functional units 61 and 62.

e4) The controller 43 initializes both of the registers 36 of the functional units 61 and 62.

e5) The matrix AA0 is divided into row vectors, and each row vector is inputted to the input register 44 as an input A0.

e6) The matrix BB0 is divided into column vectors, and each column vector is inputted to the input register 45 as an input B0.

e7) The row vector A0-0 of the first row of the matrix AA0 is inputted to the input A0in of the first row of the arithmetic operation array 41; the row vector A0-1 of the second row of the matrix AA0 is inputted to the input A0in of the second row of the arithmetic operation array 41; the row vector A0-2 of the third row of the matrix AA0 is inputted to the input A0in of the third row of the arithmetic operation array 41; and the row vector A0-3 of the fourth row of the matrix AA0 is inputted to the input A0in of the fourth row of the arithmetic operation array 41.

e8) The column vector B0-0 of the first column of the matrix BB0 is inputted to an input B0 of the first column of the arithmetic operation array 41; the column vector B0-1 of the second column of the matrix BB0 is inputted to an input B0 of the second column of the arithmetic operation array 41; the column vector B0-2 of the third column of the matrix BB0 is inputted to an input B0 of the third column of the arithmetic operation array 41; and the column vector B0-3 of the fourth column of the matrix BB0 is inputted to an input B0 of the fourth column of the arithmetic operation array 41.

e9) A matrix AA1 is divided into row vectors, and each row vector is inputted to the input register 46 as an input A1.

e10) A matrix BB1 is divided into column vectors, and each column vector is inputted to the input register 47 as an input B1.

e11) A row vector A1-0 of a first row of the matrix AA1 is inputted to the input A1in of the first column of the arithmetic operation array 41; a row vector A1-1 of a second row of the matrix AA1 is inputted to the input A1in of the second column of the arithmetic operation array 41; a row vector A1-2 of a third row of the matrix AA1 is inputted to the input A1in of the third column of the arithmetic operation array 41; and a row vector A1-3 of a fourth row of the matrix AA1 is inputted to the input A1in of the fourth column of the arithmetic operation array 41.

e12) A column vector B1-0 of a first column of the matrix BB1 is inputted to the input B1in of the first column of the arithmetic operation array 41; a column vector B1-1 of a second column of the matrix BB1 is inputted to the input B1in the second column of the arithmetic operation array 41; a column vector B1-2 of a third column of the matrix BB1 is inputted to the input B1in of the third column of the arithmetic operation array 41; and a column vector B1-3 of a fourth column of the matrix BB1 is inputted to the input B1in of the fourth column of the arithmetic operation array 41.

e13) In each arithmetic operation node 52, the following process is executed for each inputted vector element.

e13-1) The input controller 63 stores and outputs the inputs A0in and B0in in order.

e13-2) The input controller 64 stores and outputs the inputs A1in and B1in in order.

e13-3) In each of the functional units 61 and 62, arithmetic operation for the two inputs is performed.

e14) After the process for all the vector elements is completed, the following process is executed in each arithmetic operation node 52.

e14-1) The output controller 65 of each arithmetic operation node 52 stores and outputs outputs of the functional unit 61 in order.

e14-2) The output controller 66 of each arithmetic operation node 52 stores and outputs outputs of the functional unit 62 in order.

e15) An output S0 of the first column of the arithmetic operation array 41 is outputted to the output register 48 as a column vector S0-0 of a first column of a result matrix S0; an output S0 of the second column of the arithmetic operation array 41 is outputted to the output register 48 as a column vector S0-1 of a second column of the result matrix S0; an output S0 of the third column of the arithmetic operation array 41 is outputted to the output register 48 as a column vector S0-2 of a third column of the result matrix S0; and an output S0 of the fourth column of the arithmetic operation array 41 is outputted to the output register 48 as a column vector S0-3 of a fourth column of the result matrix S0.

e16) An output S1 of the first row of the arithmetic operation array 41 is outputted to the output register 49 as a column vector S1-0 of a first column of a result matrix S1; an output S1 of the second row of the interval arithmetic operation array is outputted to the output register 49 as a column vector S1-1 of a second column of the result matrix S1; an output S1 of the third row of the interval arithmetic operation array is outputted to the output register 49 as a column vector S1-2 of a third column of the result matrix S1; and an output S1 of the fourth row of the arithmetic operation array 41 is outputted to the output register 49 as a column vector S1-3 of a fourth column of the result matrix S1.

e17) The four column vectors S0-0 to S0-3 of the output register 48 are integrated and outputted as a result matrix SS0.

e18) The four row vectors S1-0 to S1-3 of the output register 49 are integrated and outputted as a result matrix SS1.

In the above SIMD arithmetic operation, arithmetic operation for two matrix products is performed in each of the functional units 61 and 62. However, arithmetic operation of one matrix product may be performed at a double speed with use of the two functional units 61 and 62.

An operation of the floating-point arithmetic device 2A at the time of the SIMD arithmetic operation mode in that case will be described.

f1) First, the controller 43 sets the multipliers 31 and the adder-subtracters 33 of each of both the functional units 61 and 62 of each arithmetic operation node to a same rounding mode. For example, when the multiplier 31 and the adder-subtracter 33 of the functional unit 61 are set to the rounding-up mode, the multiplier 31 and the adder-subtracter 33 of the functional unit 62 are also set to the rounding-up mode.

f2) The controller 43 controls the multiplexer 32 so that an output of the multiplier 31 is selected as an input to the adder-subtracters 33 of each of both the functional units 61 and 62.

f3) The controller 43 controls the multiplexer 35 so that an output of the adder-subtracter 33 is selected as an input to the register 36 of each of both the functional units 61 and 62.

f4) The controller 43 initializes both the registers 36 of the functional units 61 and 62.

f5) The matrix AA0 is divided into row vectors, and each row vector is inputted to the input register 44 as an input A0.

f6) The matrix BB0 is divided into column vectors, and each column vector is inputted to the input register 45 as an input B0.

f7) Respective elements of the row vector A0-0 of the first row of the matrix AA0 are alternately inputted to the inputs A0in and B1in of the first row of the arithmetic operation array 41; respective elements of the row vector A0-1 of the second row of the matrix AA0 are alternately inputted to the inputs A0in and B1in of the second row of the arithmetic operation array 41; respective elements of the row vector A0-2 of the third row of the matrix AA0 are alternately inputted to the inputs A0in and B1in of the third row of the arithmetic operation array 41; and respective elements of the row vector A0-3 of the fourth row of the matrix AA0 are alternately inputted to the inputs A0in and B1in of the fourth row of the arithmetic operation array 41.

f8) Respective elements of the column vector B0-0 of the first column of the matrix BB0 are alternately inputted to the inputs B0in and A1in of the first column of the arithmetic operation array 41; respective elements of the column vector B0-1 of the second column of the matrix BB0 are alternately inputted to the inputs B0in and A1in of the second column of the arithmetic operation array 41; respective elements of the column vector B0-2 of the third column of the matrix BB0 are alternately inputted to the inputs B0in and A1in of the third column of the arithmetic operation array 41; and respective elements of the column vector B0-3 of the fourth column of the matrix BB0 are alternately inputted to the inputs B0in and A1in of the fourth column of the arithmetic operation array 41.

f9) In each arithmetic operation node 52, the following process is executed for each inputted vector element.

f9-1) The input controller 63 stores and outputs the inputs A0in and B0in in order.

f9-2) The input controller 64 stores and outputs the inputs A1in and B1in in order.

f9-3) In each of the functional units 61 and 62, arithmetic operation for the two inputs is performed.

f10) After the process for all the vector elements is completed, the following process is executed in each arithmetic operation node 52.

f10-1) The controller 43 controls the multiplexer 32 so that an input from an outside is selected as an input to the adder-subtracters 33 of the functional unit 61.

f10-2) In the adder-subtracter 33 of the functional unit 61, a register value of the register 36 and a register value of the register 36 of the functional unit 12 as an input from the outside are added to each other.

f10-3) A result of the addition by the adder-subtracter 33 is stored into the register 36 of the functional unit 61.

f11) The output controller 65 of each arithmetic operation node 52 stores and outputs outputs of the functional unit 61 in order.

f12) An output S0 of the first column of the arithmetic operation array 41 is outputted to the output register 48 as a column vector S0-0 of a first column of a result matrix S0; an output S0 of the second column of the arithmetic operation array 41 is outputted to the output register 48 as a column vector S0-1 of a second column of the result matrix S0; an output S0 of the third column of the arithmetic operation array 41 is outputted to the output register 48 as a column vector S0-2 of a third column of the result matrix S0; and an output S0 of the fourth column of the arithmetic operation array 41 is outputted to the output register 48 as a column vector S0-3 of a fourth column of the result matrix S0.

f13) The four column vectors S0-0 to S0-3 of the output register 48 are integrated and outputted as a result matrix SS0.

As described above, it is possible to execute arithmetic operation of one matrix product at a double speed using the two functional units 61 and 62 of each arithmetic operation node 52 of the arithmetic operation array 41.

As described above, the floating-point arithmetic device of the present embodiment can execute matrix product arithmetic operation based on SIMD arithmetic operation at a time of an arithmetic operation mode from which arithmetic operation accuracy is not required and execute matrix product arithmetic operation based on interval arithmetic operation by which an arithmetic operation result and arithmetic operation accuracy information can be acquired, at a time of an arithmetic operation mode from which arithmetic operation accuracy is required.

Figure 8:
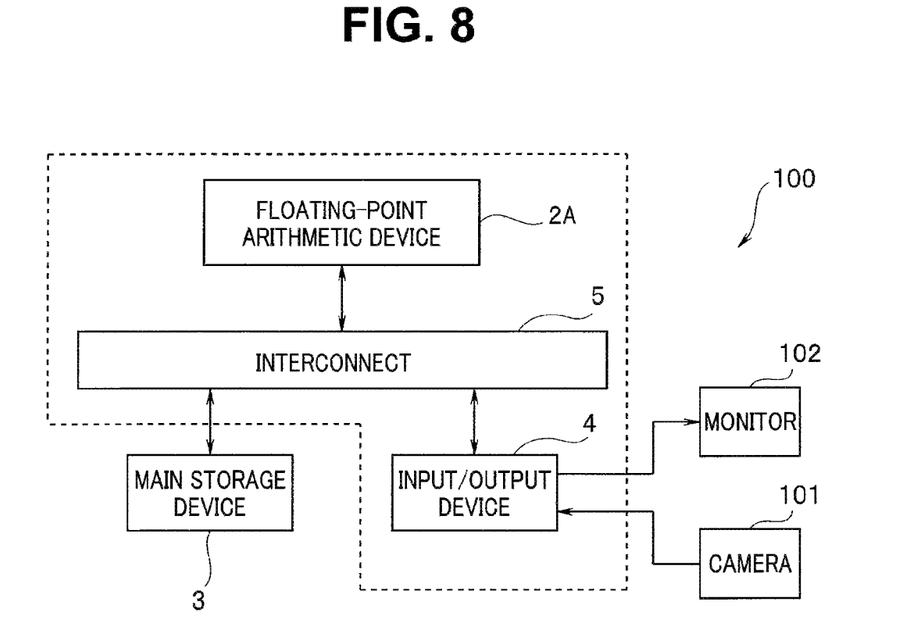
FIG. 8 is a block diagram showing a configuration of an information processing system having the floating-point arithmetic device of the second embodiment.

The floating-point arithmetic device of each embodiment is usable in various kinds of fields. For example, the floating-point arithmetic device 2A of the second embodiment is applicable, for example, to an image processing system. FIG. 8 is a block diagram showing a configuration of an information processing system having the floating-point arithmetic device of the present embodiment. In FIG. 8, same components as those in FIG. 1 are given same reference numerals, and description thereof will be omitted.

An example of an information processing system 100 shown in FIG. 8 is an image processing system which includes the floating-point arithmetic device 2A, the main storage device 3, the input/output device 4, the interconnect 5, a camera 101 having, for example, an image sensor, and a monitor 102 as a display device. A range indicated by a dotted line in FIG. 8 is formed, for example, on one semiconductor device.

This is applicable, for example, to a case where three-dimensional shape data of a subject, such as a building nearby, is generated from an image picked up by the camera 101 mounted on a vehicle. In that case, in execution of an application program for constructing three-dimensional data of the subject from two-dimensional data obtained by image pickup, arithmetic operation accuracy of position data of pixels of the image data is required. In such a system, the floating-point arithmetic device 2A is extremely effective. Processing of the image corresponding to the two-dimensional image data is executed in the interval arithmetic operation mode to generate the three-dimensional data. An arithmetic operation result and arithmetic operation accuracy information are displayed on the monitor 102, and a user can visually check the high-accuracy three-dimensional data using the arithmetic operation accuracy information.

As described above, according to each embodiment, it is possible to provide a floating-point arithmetic device capable of switching between interval arithmetic operation by which an arithmetic operation result of the interval arithmetic operation and arithmetic operation accuracy information are acquired at a same time and SIMD arithmetic operation, a semiconductor device and an information processing system.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A floating-point arithmetic device comprising:
a first functional unit configured to receive first input data to execute first arithmetic operation in a first rounding mode; and
a second functional unit configured to receive second input data to execute second arithmetic operation in a second rounding mode; wherein
the first functional unit comprises a first output circuit capable of selectively outputting a first output or a first arithmetic operation result of the first arithmetic operation, the first output obtained by halving a first value obtained by adding a second arithmetic operation result of the second arithmetic operation to the first arithmetic operation result; and
the second functional unit comprises a second output circuit capable of selectively outputting a second output or the second arithmetic operation result, the second output obtained by halving a second value obtained by subtracting the second arithmetic operation result from the first arithmetic operation result.

2. The floating-point arithmetic device according to claim 1, wherein
the first rounding mode is a rounding-up mode; and
the second rounding mode is a rounding-down mode.

3. The floating-point arithmetic device according to claim 1, wherein
the first functional unit comprises:
a first adder configured to receive the first arithmetic operation result to perform cumulative addition and output a first addition value; and
a first register configured to store the first addition value;
the second functional unit comprises:
a second adder configured to receive the second arithmetic operation result to perform cumulative addition and output a second addition value; and
a second register configured to store the second addition value;
the first functional unit comprises a first selection circuit configured to selectively output the first arithmetic operation result or the second addition value to the first adder; and
the second functional unit comprises a second selection circuit configured to selectively output the second arithmetic operation result or the first addition value to the second adder.

4. The floating-point arithmetic device according to claim 3, wherein the second adder is an adder-subtracter calculating the second value.

5. The floating-point arithmetic device according to claim 3, wherein the first adder and the second adder are adder-subtracters.

6. The floating-point arithmetic device according to claim 3, wherein
the first functional unit comprises:
a first halving circuit configured to halve the first value and output a result as the first output; and
a third selection circuit configured to selectively output the first output or the first addition value to the first register; and
the second functional unit comprises:
a second halving circuit configured to halve the second value and output a result as the second output; and
a fourth selection circuit configured to selectively output the second output or the second addition value to the second register.

7. The floating-point arithmetic device according to claim 3, wherein
the first input data is a first pair of pieces of vector data;
the second input data is a second pair of pieces of vector data; and
the first arithmetic operation and the second arithmetic operation are a multiplication process for elements of each piece of vector data.

8. The floating-point arithmetic device according to claim 3, comprising an arithmetic operation array where a plurality of arithmetic operation nodes are arrayed in a matrix shape, each node comprising the first functional unit, the second functional unit, the first output circuit and the second output circuit, wherein
the first input data is first matrix data;
the second input data is second matrix data; and
row data of the first matrix data and column data of the second matrix data are inputted to the arithmetic operation array.

9. The floating-point arithmetic device according to claim 3, wherein
the first input data is a half of a pair of pieces of vector data;
the second input data is a remaining half of the pair of pieces of vector data;
the first arithmetic operation and the second arithmetic operation are a multiplication process for elements of the pair of pieces of vector data; and
the first output circuit outputs the first value obtained by adding the first arithmetic operation result and the second arithmetic operation result to each other.

10. The floating-point arithmetic device according to claim 1, wherein
the first input data is a half of a pair of pieces of vector data;
the second input data is a remaining half of the pair of pieces of vector data;
the first arithmetic operation and the second arithmetic operation are a multiplication process for elements of the pair of pieces of vector data; and
the first output circuit outputs the first value obtained by adding the first arithmetic operation result and the second arithmetic operation result to each other.

11. A semiconductor device comprising the floating-point arithmetic device according to claim 1.

12. An information processing system comprising:
the floating-point arithmetic device according to claim 1;
an input interface configured to receive the first input data and the second input data; and
an output interface configured to output output data of the first output circuit and the second output circuit.

13. The information processing system according to claim 12, wherein the first input data and the second input data are image data.

* * * * *